(12) United States Patent
Arai et al.

(10) Patent No.: US 10,970,191 B2
(45) Date of Patent: Apr. 6, 2021

(54) SEMICONDUCTOR DEVICE AND DEBUG METHOD

(71) Applicant: RENESAS ELECTRONICS CORPORATION, Tokyo (JP)

(72) Inventors: Yuta Arai, Tokyo (JP); Kyoko Hasegawa, Tokyo (JP); Hiroyuki Sasaki, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

(21) Appl. No.: 16/406,845

(22) Filed: May 8, 2019

(65) Prior Publication Data
US 2019/0361786 A1 Nov. 28, 2019

(30) Foreign Application Priority Data
May 25, 2018 (JP) .............................. JP2018-100239

(51) Int. Cl.
*G06F 9/44* (2018.01)
*G06F 9/445* (2018.01)
(Continued)

(52) U.S. Cl.
CPC ........ *G06F 11/362* (2013.01); *G06F 9/30192* (2013.01)

(58) Field of Classification Search
CPC ............................ G06F 11/362; G06F 9/30192
See application file for complete search history.

(56) References Cited

U.S. PATENT DOCUMENTS 9,146,835 B2 * 9/2015 Bellows .................. G06F 1/12
10,102,050 B2 * 10/2018 Kris .................. G01R 31/2851
(Continued)

FOREIGN PATENT DOCUMENTS

JP 2014-132384 A 7/2014

OTHER PUBLICATIONS

Fernanda Lima Kastensmidt, Applying Dual-Core Lockstep in Embedded Processors to Mitigate Radiation-induced, 2017, pp. 1-95. https://www.lume.ufrgs.br/bitstream/handle/10183/173785/001061371.pdf?sequence=1 (Year: 2017).*

(Continued)

*Primary Examiner* — Mongbao Nguyen
(74) *Attorney, Agent, or Firm* — McDermott Will & Emery LLP

(57) ABSTRACT

Debugging a program in an apparatus using a lockstep method are more efficiently performed and a semiconductor apparatus includes a first processor core, a second processor core, a first debug circuit, a second debug circuit, and an error control circuit capable of outputting an error signal for stopping execution of a program by the first processor core and the second processor core. The second debug circuit performs setting regarding debugging different from that of the first processor core with respect to the second processor core. Even if a first processing result of the first processor core and a second processing result of the second processor core do not coincide with each other, the error control circuit invalidates the output of the error signal when the first processor core executes the program and the second processor core stops execution of the program based on the setting regarding debugging.

8 Claims, 10 Drawing Sheets

(51) Int. Cl.
    *G06F 11/36*     (2006.01)
    *G06F 9/30*     (2018.01)

(56) References Cited

U.S. PATENT DOCUMENTS

| | | | | |
|---|---|---|---|---|
| 10,621,067 | B1* | 4/2020 | Tzimpragos | G06F 11/3624 |
| 2008/0016415 | A1* | 1/2008 | Ide | G06F 11/366 |
| | | | | 714/702 |
| 2010/0122072 | A1 | 5/2010 | Yarimizu | |
| 2010/0262811 | A1* | 10/2010 | Moyer | G06F 11/1679 |
| | | | | 712/227 |
| 2011/0179309 | A1* | 7/2011 | Pathirane | G06F 11/3648 |
| | | | | 714/37 |
| 2011/0254602 | A1* | 10/2011 | Steiner | G06F 11/1679 |
| | | | | 327/158 |
| 2014/0258684 | A1* | 9/2014 | Hastie | G06F 11/0793 |
| | | | | 712/216 |
| 2016/0055047 | A1* | 2/2016 | Okamoto | G06F 11/22 |
| | | | | 714/57 |
| 2017/0083431 | A1* | 3/2017 | Burger | G06F 9/30105 |
| 2017/0103010 | A1* | 4/2017 | Chang | G06F 11/362 |
| 2018/0210811 | A1* | 7/2018 | Wang | G06F 11/2242 |
| 2018/0217915 | A1* | 8/2018 | Wang | G06F 11/3656 |
| 2019/0171536 | A1* | 6/2019 | Refaeli | G06F 11/1629 |
| 2019/0324751 | A1* | 10/2019 | Boschi | G06F 9/5011 |
| 2019/0340067 | A1* | 11/2019 | Kim | G06F 11/1048 |

OTHER PUBLICATIONS

Extended European Search Report issued in corresponding European Patent Application No. 19175046.2-1224, dated Oct. 22, 2019.

\* cited by examiner

FIG. 3

| ERROR OUTPUT SETTING REGISTER | COINCIDENCE DETERMINATION SIGNAL | MAIN STATE SIGNAL | LOCKSTEP STATE SIGNAL | ERROR SIGNAL |
|---|---|---|---|---|
| 0 (ENABLED) | 0 (NOT COINCIDE) | 0 (EXECUTION STATE) | 0 (EXECUTION STATE) | 1 (OUTPUT) |
| 0 | 0 | 1 (BREAK STATE) | 1 (BREAK STATE) | 0 |
| 0 | 0 | 1 | 0 | 0 |
| 0 | 1 (COINCIDE) | * | * | 0 |
| 1 (INVALIDATED) | * | * | * | 0 |

| MISMATCH DETECTION SETTING REGISTER | BREAKPOINT DETECTION SIGNAL | COINCIDENCE DETERMINATION SIGNAL | BREAK REQUEST SIGNAL |
|---|---|---|---|
| 0 (INVALIDATED) | 0 (BREAK IS NOT DETECTED) | 0 (NOT COINCIDE) | 0 |
| 0 | 0 | 1 (COINCIDE) | 0 |
| 0 | 1 (BREAK IS DETECTED) | 0 | 0 |
| 0 | 1 | 1 | 1 (OUTPUT) |
| 1 (ENABLED) | 0 | 0 | 1 |
| 1 | 0 | 1 | 0 |
| 1 | 1 | 0 | 1 |
| 1 | 1 | 1 | 1 |

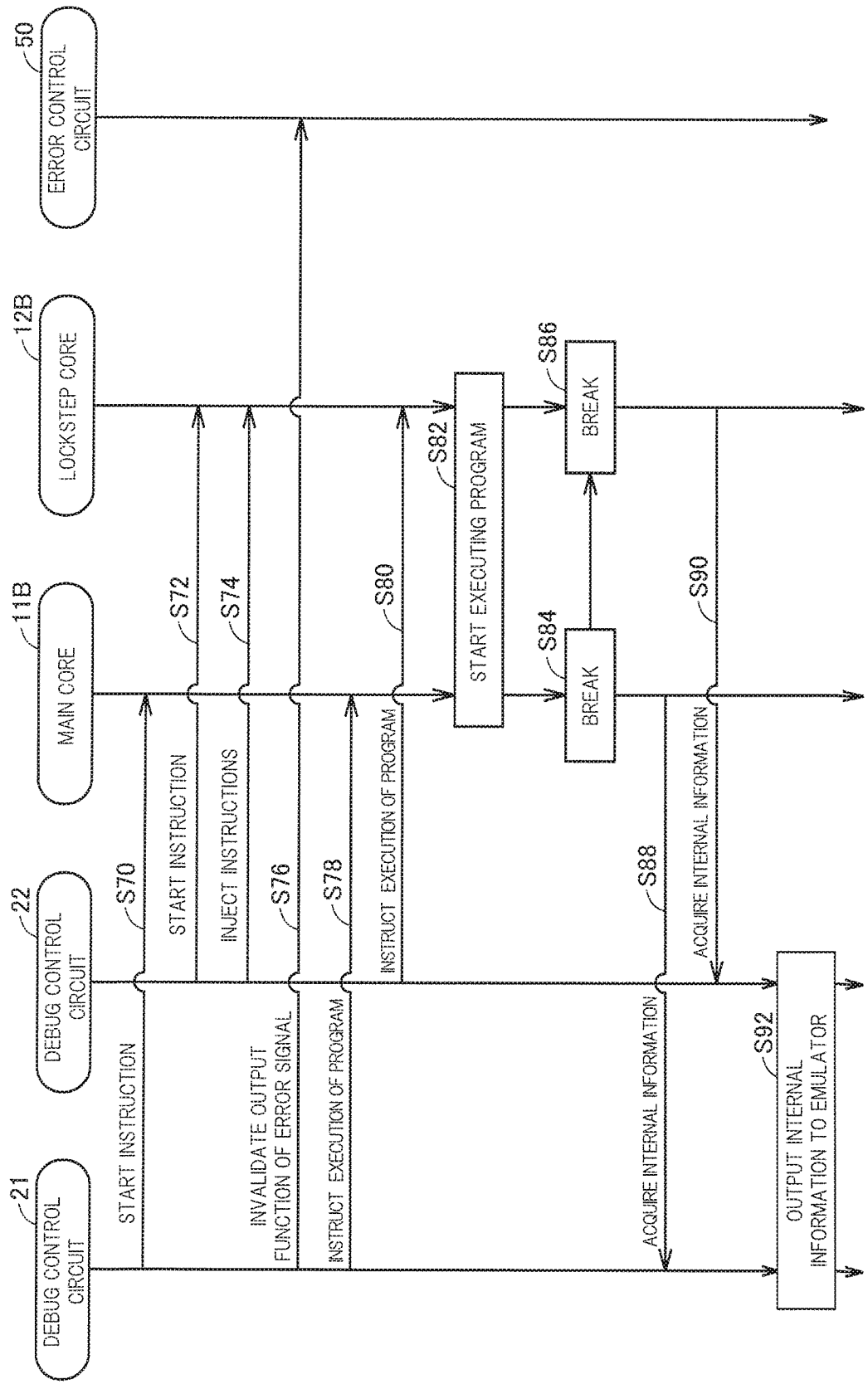

SEMICONDUCTOR DEVICE AND DEBUG METHOD

CROSS-REFERENCE TO RELATED APPLICATIONS

The disclosure of Japanese Patent Application. No. 2018-100239 filed on May 25, 2018 including the specification, drawings and abstract is incorporated herein by reference in its entirety.

BACKGROUND

The present disclosure relates to a semiconductor device and a debugging method, and can be suitably applied to, for example, a device using a lockstep method.

Conventionally, in a control device or the like for a vehicle, even if a failure occurs in a microcomputer which is a constituent element of the control device or the like, a function of securing minimum allowable safety by applying a functional contrivance is required. For example, even if a failure occurs, it is required to detect the failure within a predetermined period of time after the occurrence of the failure.

As an example of functional contrivance, a lockstep method using a plurality of processor cores is known. In connection with this technique, Japanese unexamined Patent Application publication No. 2014-132384 discloses a technique related to a microcomputer using a lockstep method.

The microcomputer according to the Japanese unexamined Patent Application publication No. 2014-132384 includes first and second CPU cores, a storage unit storing a table in which information of a plurality of flip-flops and a plurality of functional blocks is stored, and a control unit. In the normal operation mode, the control unit switches the mode from the normal operation mode to the inconsistent portion specifying mode when the inconsistency between the outputs of the first and second CPU cores is detected. In the inconsistent portion specifying mode, the control unit extracts a function block corresponding to the flip-flop specified on the basis of the comparison result of the outputs of the scan chains of the first and second CPU cores from the table, and stops the function of the function block.

SUMMARY

When debugging for acquiring internal information of a processor core is executed in the development stage of a program used in a control apparatus for vehicle or the like, it is necessary to prepare in advance or it is necessary to pay attention to breakage of an electronic component, for example, a motor, so that it may be difficult to efficiently proceed with the debugging operation. Therefore, in the program development stage, it is required to advance debugging work more efficiently. Although the Japanese unexamined Patent Application publication No. 2014-132384 discloses a microcomputer that operates in a lockstep manner, it does not teach or suggest any debugging method for realizing an efficient debugging operation.

Other objects and novel features will become apparent from the description of this specification and the accompanying drawings.

A semiconductor device according to an embodiment includes first and second processor cores, first and second debug circuits, and an error control circuit capable of outputting an error signal for stopping execution of a program by the first and second processor cores. The second debug circuit performs setting regarding debugging different from that of the first processor core with respect to the second processor core. Even if the first processing result of the first processor core and the second processing result of the second processor core do not coincide with each other, the error control circuit invalidates the output of the error signal when the first processor core executes the program and the second processor core stops the execution of the program based on the setting relating to debugging.

A debugging method according to one embodiment is performed by a computer including first and second processor cores. The debugging method includes the steps of performing settings for debugging different from the first processor core with respect to the second processor core, and outputting an error signal to stop execution of a program by the first and second processor cores. The outputting step includes the step of invalidating the output of the error signal when the first processor core executes the program and the second processor core stops the execution of the program based on the setting regarding debugging even when the first processing result of the first processor core and the second processing result of the second processor core do not coincide with each other.

According to one embodiment, the debugging operation of the program can be performed more efficiently in the apparatus using the lockstep method.

BRIEF DESCRIPTION OF THE DRAWINGS

FIG. 3 is an information table for explaining an output function of an error signal according to the first embodiment.

FIG. 5 is an information table for explaining the output function of the break request signal according to the first embodiment.

FIG. 10 is a diagram illustrating a processing procedure performed by a debugging system according to the third embodiment.

DETAILED DESCRIPTION

Figure 1:
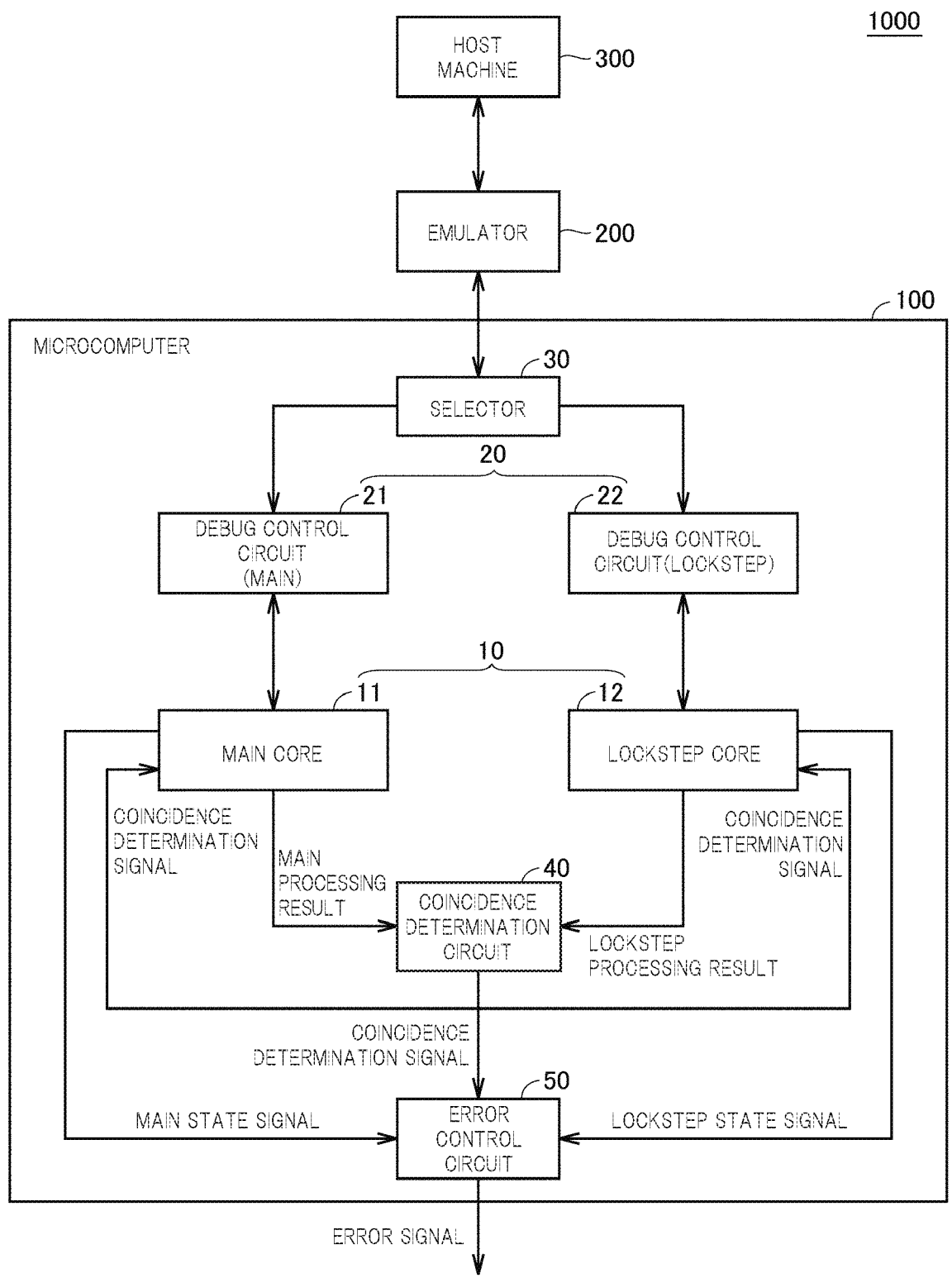
FIG. 1 is a schematic diagram showing a configuration example of a debugging system according to a first embodiment.

Hereinafter, each embodiment will be described in detail with reference to the drawings. The same or corresponding portions are denoted by the same reference numerals, and description thereof will not be repeated.

First Embodiment

FIG. 1 is a schematic diagram showing a configuration example of a debugging system 1000 according to the first embodiment. Referring to FIG. 1, a debugging system 1000 includes a microcomputer 100, an emulator 200, and a host machine 300.

The host machine 300 is a computer device such as a PC (Personal Computer), and executes programs (e.g., debuggers) for supporting debugging of the microcomputer 100. The debugger provides a function for a user to interactively control the execution of a program in the microcomputer 100, and to display or change a value of a register, a content of a memory, or the like on a screen. The host machine 300 communicates with the emulator 200 through a communication interface such as a USB (Universal Serial Bus) interface (I/F), and operates in cooperation with the emulator 200.

The emulator 200 is a device used for debugging programs to be executed by the CPU (Central Processing Unit) on the microcomputer 100. The emulator 200 communicates with the debugging control circuitry 20 via a selector 30, for example, through a communication interface in accordance with the standards of the JTAG (Joint Test Action Group) to control the debugging function. The debugging function includes, for example, execution control of the processor core 10, acquisition and change of register values in the processor core 10, and acquisition and change of contents of an internal memory on the microcomputer 100.

The microcomputer 100 includes a main processor core (hereinafter also referred to as "main core") 11, a sub processor core (hereinafter also referred to as "lockstep core") 12, a debug control circuit 20, a selector 30, a match determination circuit 40, and an error control circuit 50. Hereinafter, when a configuration and a function common to each of the main core 11 and the lockstep core 12 are described, they are collectively referred to as a processor core 10.

The microcomputer 100 further includes an internal memory (not shown) such as a RAM (Random Access Memory) and a flash memory. The internal memory stores, for example, a program to be debugged which is executed by the main core 11 and the lockstep core 12.

The microcomputer 100 employs a lockstep dual core configuration including a main core 11 and a lockstep core 12. The lock-step dual-core configuration is a configuration in which the two processor cores execute the same processing, and the difference between the processing results is compared to detect the presence or absence of a defect.

Typically, the main core 11 reads (i.e., fetches) a plurality of instructions (i.e., programs) stored in the instruction memory, and sequentially processes the read plurality of instructions. For example, the main core 11 writes data generated by executing a process according to an instruction into an internal memory, or reads data required by executing a process according to an instruction from the internal memory. Further, the main core 11 outputs the processing result of the processing according to the instruction to the peripheral circuit via the peripheral bus.

The lockstep core 12 has a redundant configuration with the main core 11. That is, the lockstep core 12 has the same performance and function as the main core 11. The lockstep core 12 performs the lockstep operation, thereby executing the same processing as that of the main core 11 substantially at the same time.

However, the lockstep core 12 does not need to have exactly same configuration as the main core 11, and the clock timing, the delay amount, or the like may be changed as long as the performance and the function equivalent to those of the main core 11 can be realized. In the following description, it is assumed that the main core 11 and the lockstep core 12 have the same configuration for ease of description.

Each of the main core 11 and the lockstep core 12 outputs the processing result to the coincidence determination circuit 40. Each of the main core 11 and the lockstep core 12 outputs a state signal indicating whether it is in a state of executing a program or a state of stopping the execution of the program to the error control circuit 50. In the following description, the state signal of the main core 11 is also referred to as a "main state signal", and the state signal of the lockstep core 12 is also referred to as a "lockstep state signal".

The debug control circuit 20 operates in accordance with an instruction from the emulator 200 via the selector 30. Specifically, the debug control circuit 20 includes a debug control circuit 21 for the main core 11 and a debug control circuit 22 for accessing the lockstep core 12.

The debug control circuit 21 performs debug-related setting for the main core 11 in accordance with an instruction from the emulator 200. Specifically, the debug control circuit 21 realizes debugging functions such as execution control of the main core 11, acquisition and change of register values in the main core 11, acquisition and change of contents of the internal memory, and the like.

The debug control circuit 22 performs debug-related setting for the lockstep core 12 in accordance with an instruction from the emulator 200. Specifically, the debug control circuit 22 realizes a debug function such as execution control of the lockstep core 12, acquisition and change of register values in the lockstep core 12, acquisition and change of internal memory contents, and a breakpoint for stopping execution of a program at a specified address.

The selector 30 is a circuit that selects at least one of the debug control circuit 21 and the debug control circuit 22 and gives an instruction from the emulator 200 to the selected debug control circuit. For example, the selector 30 receives a selection instruction of the debug control circuit and a setting instruction related to debugging from the emulator 200. The selector 30 outputs the setting instruction to the debug control circuit according to the selection instruction.

The emulator 200 can give different setting instructions to the debug control circuit 21 and the debug control circuit 22 via the selector 30. That is, the emulator 200 can perform a debug setting different from that of the main core 11 with respect to the lockstep core 12.

The coincidence determination circuit 40 determines whether or not the processing result of the main core 11 (hereinafter, also referred to as "main processing result") coincides with the processing result of the lockstep core 12 (hereinafter, also referred to as "lockstep processing result"). The coincidence determination circuit 40 outputs the determination result to the error control circuit 50 as a coincidence determination signal.

The error control circuit 50 outputs an error signal for stopping the operation of the microcomputer 100 (i.e., stopping the execution of the program by the main core 11 and the lockstep core 12) when a predetermined condition is satisfied. Specifically, the error control circuit 50 is configured as shown in FIG. 2.

Figure 2:
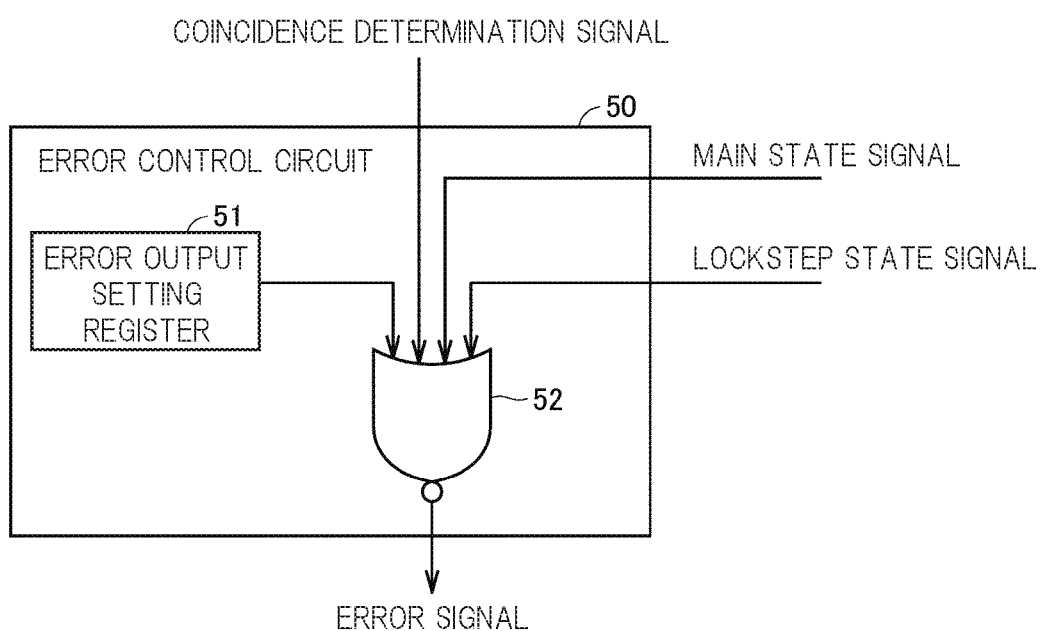
FIG. 2 is a diagram showing a configuration example of an error control circuit according to the first embodiment.

FIG. 2 is a diagram showing a configuration example of the error control circuit 50 according to the first embodiment. Referring to FIG. 2, error control circuit 50 includes an error output setting register 51 and an error output circuit 52.

The error output setting register 51 stores a setting value for setting the output function of the error signal by the error control circuit 50 to valid or invalid. Specifically, when the output function of the error signal is disabled, the set value "1" is stored (set) in the error output setting register 51. When the error signal output function is enabled, the set value "0" is set in the error output setting register 51. Typically, the debug control circuit 20 (for example, the debug control circuit 21) sets the set value "1" or the set value "0" in the error output setting register 51 in accordance with an instruction from the emulator 200.

The error output circuit 52 includes, for example, a NOR gate. The error output circuit 52 outputs an error signal based on the set value stored in the error output setting register 51, the coincidence determination signal received from the coincidence determination circuit 40, the main state signal received from the main core 11, and the lockstep state signal received from the lockstep core 12. Specifically, the error output circuit 52 outputs an error signal in accordance with the information table 402 shown in FIG. 3.

FIG. 3 is an information table 402 for explaining an error signal output function according to the first embodiment. Referring to FIG. 3, in the information table 402, the set value "1" stored in the error output setting register 51 indicates that the output function of the error signal is invalidated. The set value "0" stored in the error output setting register 51 indicates that the output function of the error signal is enabled. The value "1" of the coincidence determination signal indicates that the determination result by the coincidence determination circuit 40 coincides. The value "0" of the coincidence determination signal indicates that the determination result does not coincide.

The value "0" of the main state signal indicates a state in which the main core 11 is executing the program (hereinafter, also referred to as "execution state"), and the value "1" of the main state signal indicates a state in which the main core 11 is stopping the program (hereinafter, also referred to as "break state"). Similarly, the value "0" of the lockstep status signal indicates that the lockstep core 12 is in the execution state, and the value "1" of the lockstep status signal indicates that the lockstep core 12 is in the break state. The value "1" of the error signal indicates that the error signal is output, and the value "0" of the error signal indicates that the error signal is not output.

First, a method of outputting an error signal when the set value stored in the error output setting register 51 is "0" (i.e., when the output function of the error signal is valid) is described.

When the main processing result and the lockstep processing result do not match and the main core 11 and the lockstep core 12 are in the execution state, the error output circuit 52 validates the output of the error signal, that is, outputs the error signal. In this case, the main core 11 and the lockstep core 12 transition to the break state by the error signal.

Even if the main processing result and the lockstep processing result do not match, the error output circuit 52 invalidates the output of the error signal (i.e., does not output the error signal) when either the main core 11 or the lockstep core 12 is in the break state. Thus, for example, even when the main core 11 is in the execution state and the lockstep core 12 is in the break state, the main processing result and the lockstep processing result do not coincide with each other, the error signal is not output. Therefore, the main core 11 can continue the execution state.

The error output circuit 52 does not output an error signal when the main processing result and the lockstep processing result do not match and both the main core 11 and the lockstep core 12 are in the break state.

Next, the case where the set value stored in the error output setting register 51 is "1" (that is, the case where the output function of the error signal is invalid) will be described. In this case, the error output circuit 52 does not output an error signal. Specifically, the error output circuit 52 does not always output the error signal regardless of the coincidence determination results of the main processing result and the lockstep processing result and the states of the main core 11 and the lockstep core 12.

<Configuration of a Processor Core>

In the first embodiment, the error signal output function shown in FIG. 3 and the function of the processor core 10, which will be described later, are used to continue the program execution state of the main core 11, while the lockstep core 12 is broken by the setting of the breakpoint, and the internal information of the lockstep core 12, for example, the value of the general-purpose register or the like, is acquired. In addition, by using the coincidence determination function between the main processing result and the lockstep processing result, it is also ensured that the internal information of the lockstep core 12 is the same as the internal information of the main core 11. Hereinafter, the configuration and the like of the processor core 10 according to the first embodiment will be described in detail.

Figure 4:
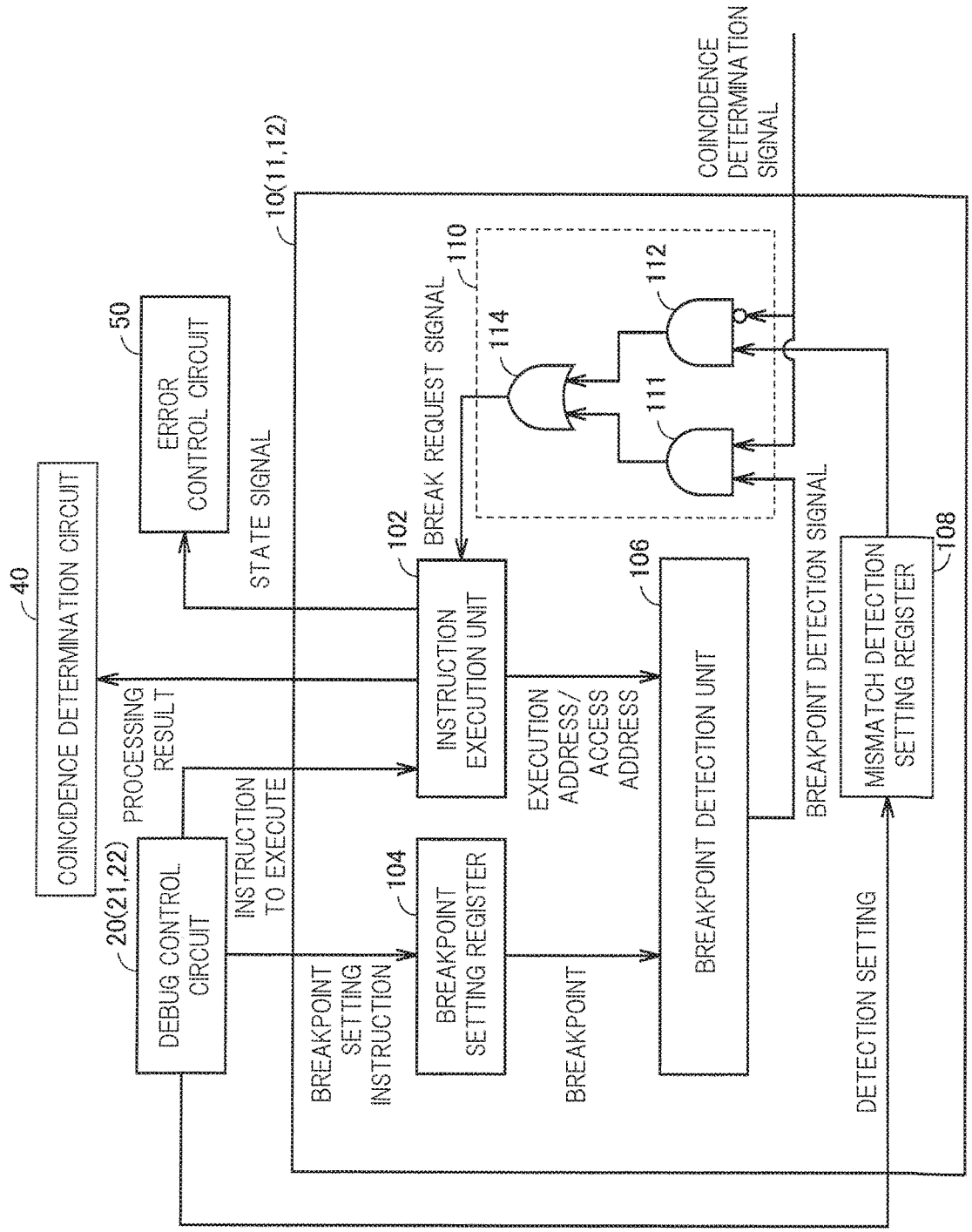
FIG. 4 is a diagram illustrating a configuration example of a processor core according to the first embodiment.

FIG. 4 is a diagram showing a configuration example of the processor core 10 according to the first embodiment. Referring to FIG. 4, processor core 10 includes an instruction execution unit 102, a breakpoint setting register 104, a breakpoint detection unit 106, a mismatch detection setting register 108, and a request output circuit 110. The processor core 10 includes various registers such as a general-purpose register and a special-purpose register. In the following description, typically, it is assumed that the processor core 10 shown in FIG. 4 is the lockstep core 12.

The instruction execution unit 102 executes processing in accordance with a control instruction from the debug control circuit 22, for example, an instruction to execute a program. Typically, the instruction execution unit 102 stores an instruction included in a program read from an internal memory in an instruction buffer, analyzes the content of the instruction stored in the instruction buffer, and executes a process according to the content of the analyzed instruction. The instruction execution unit 102 outputs the execution address and the access address of the program to the breakpoint detection unit 106. The instruction execution unit 102 outputs the processing result to the coincidence determination circuit 40, and outputs a status signal to the error control circuit 50.

The debug control circuit 22 sets a breakpoint (address) for breaking the lockstep core 12 (instruction execution unit 102) in the breakpoint setting register 104 of the lockstep core 12 in accordance with an instruction from the emulator 200. Typically, the user uses the host machine 300 to set a breakpoint at a location where the program is to be analyzed. The breakpoint is not set in the breakpoint setting register 104 of the main core 11. Therefore, the debug control circuit 22 sets a breakpoint for the lockstep core 12 as a setting related to debugging different from the main core 11.

The breakpoint detection unit 106 detects whether or not the breakpoint has been reached based on the execution address (or access address) of the instruction execution unit 102 and the breakpoint set by the debug control circuit 22. More specifically, when the breakpoint set in the breakpoint setting register 104 coincides with the execution address of the instruction execution unit 102, the breakpoint detection unit 106 detects the arrival at the breakpoint, and outputs a breakpoint detection signal to the request output circuit 110.

The mismatch detection setting register 108 stores a setting value indicating whether or not to give a break request signal to the instruction execution unit 102 when the main processing result and the lockstep processing result do not match. The debug control circuit 22 stores the set value in the mismatch detection setting register 108 in accordance with an instruction from the emulator 200.

The request output circuit 110 outputs a break request signal for breaking the instruction execution unit 102 when a predetermined condition is satisfied. The request output circuit 110 includes, for example, AND gates 111 and 112 and an OR gate 114. The request output circuit 110 outputs a break request signal based on the set value stored in the mismatch detection setting register 108, the coincidence determination signal received from the coincidence determination circuit 40, and the break detection signal received from the breakpoint detection unit 106. Specifically, the request output circuit 110 outputs a break request signal in accordance with the information table 406 shown in FIG. 5.

FIG. 5 is an information table 406 for explaining the function of outputting a break request signal according to the first embodiment. Referring to FIG. 5, in the information table 406, the setting value "0" stored in the mismatch detection setting register 108 indicates that the output function of the break request signal is invalidated when the main processing result and the lockstep processing result do not match. The value "1" set in the mismatch detection setting register 108 indicates that the output function of the break request signal is enabled when these processing results are mismatched.

The value "0" of the breakpoint detection signal indicates that the breakpoint is not detected. The value "1" of the breakpoint detection signal indicates that a breakpoint has been detected. The value "1" of the coincidence determination signal indicates that the determination result by the coincidence determination circuit 40 coincides. The value "0" of the coincidence determination signal indicates that the determination result does not coincide. The value "1" of the break request signal indicates that the break request signal is output. The value "0" of the break request signal indicates that the break request signal is not output.

In the first embodiment, when breaking the lockstep core 12 while continuing the execution state of the main core 11, it is ensured that the internal information of the lockstep core 12 is the same as the internal information of the main core 11. Therefore, when the main processing result and the lockstep processing result do not coincide with each other, the lockstep core 12 is configured not to break. That is, the setting value stored in the mismatch detection setting register 108 is set to "0".

A method of outputting the break request signal when the setting value stored in the mismatch detection setting register 108 is "0" will be described.

The request output circuit 110 does not output the break request signal when the breakpoint is not detected (i.e., when the value of the breakpoint detection signal is "0") and the main processing result and the lockstep processing result do not match (i.e., when the value of the coincidence determination signal is "0").

The request output circuit 110 does not output the break request signal when the main processing result and the lockstep processing result do not match even when the breakpoint is detected (i.e., the value of the breakpoint detection signal is "1"). This is to ensure that the internal information of the lockstep core 12 is the same as the internal information of the main core 11, as described above.

Note that the request output circuit 110 does not output the break request signal when the breakpoint is not detected and the main processing result and the lockstep processing result match (i.e., the value of the coincidence determination signal is "1"). This is because the main core 11 and the lockstep core 12 normally execute the lockstep operation.

On the other hand, when the breakpoint is detected (i.e., when the value of the breakpoint detection signal is "1"), and when the main processing result and the lockstep processing result match (i.e., when the value of the coincidence determination signal is "1"), the request output circuit 110 outputs the break request signal to the instruction execution unit 102. This makes it possible to break the lockstep core 12, specifically, the instruction execution unit 102, while ensuring that the internal information of the main core 11 is the same as the internal information of the lockstep core 12.

Next, a method of outputting the break request signal when the value set in the mismatch detection setting register 108 is "1" will be described.

The request output circuit 110 outputs the break request signal when the main processing result and the lockstep processing result are inconsistent (i.e., the value of the coincidence determination signal is "0") regardless of whether or not the breakpoint is detected (i.e., whether or not the value of the breakpoint detection signal is "0" or "1"). This is different from the output operation when the setting value stored in the mismatch detection setting register 108 is "0".

The request output circuit 110 does not output the break request signal when the breakpoint is not detected (i.e., when the value of the breakpoint detection signal is "0") and the main processing result and the lockstep processing result match (i.e., when the value of the coincidence determination signal is "1"). This is the same as the output operation when the setting value stored in the mismatch detection setting register 108 is "0".

The request output circuit 110 outputs the break request signal to the instruction execution unit 102 when the breakpoint is detected (i.e., when the value of the breakpoint detection signal is "1"), and when the main processing result and the lockstep processing result match (i.e., when the value of the coincidence determination signal is "1"). This is the same as the output operation when the setting value stored in the mismatch detection setting register 108 is "0".

According to the above, by storing the set value "0" in the mismatch detection setting register 108, the break request signal is output only when the breakpoint of the lockstep core 12 is detected and the main processing result and the lockstep processing result match. In this case, the lockstep core 12 (instruction executing unit 102) is broken in a state in which it is guaranteed that it has the same internal information as the internal information of the main core 11. The instruction execution unit 102 outputs a state signal indicating the break state to the error control circuit 50.

Further, a breakpoint is not set in the main core 11. Therefore, the main core 11 maintains the execution state even if the lockstep core 12 transitions to the break state. The main core 11 outputs a state signal indicating the execution state to the error control circuit 50.

At this time, since the main core 11 is in the execution state and the lock step core 12 is in the break state, the coincidence determination circuit 40 determines that the main processing result and the lockstep processing result do not coincide with each other. The coincidence determination circuit 40 outputs a coincidence determination signal indicating that these processing results do not coincide to the error control circuit 50.

Even if the main processing result and the lockstep processing result do not match, the error control circuit 50 disables the output of the error signal when the main core 11 is in the execution state and the lockstep core 12 is in the break state due to the setting of the breakpoint, as shown in FIG. 3. Therefore, the main core 11 can continue the execution state without being broken by the error signal.

Then, the debug control circuit 22 acquires (reads) the internal information of the lockstep core 12, which is guaranteed to be the same as the internal information of the main core 11, and outputs to the emulator 200. The host machine 300 displays the internal information as internal information of the main core 11 on a display or the like.

<Processing Procedure>

Figure 6:
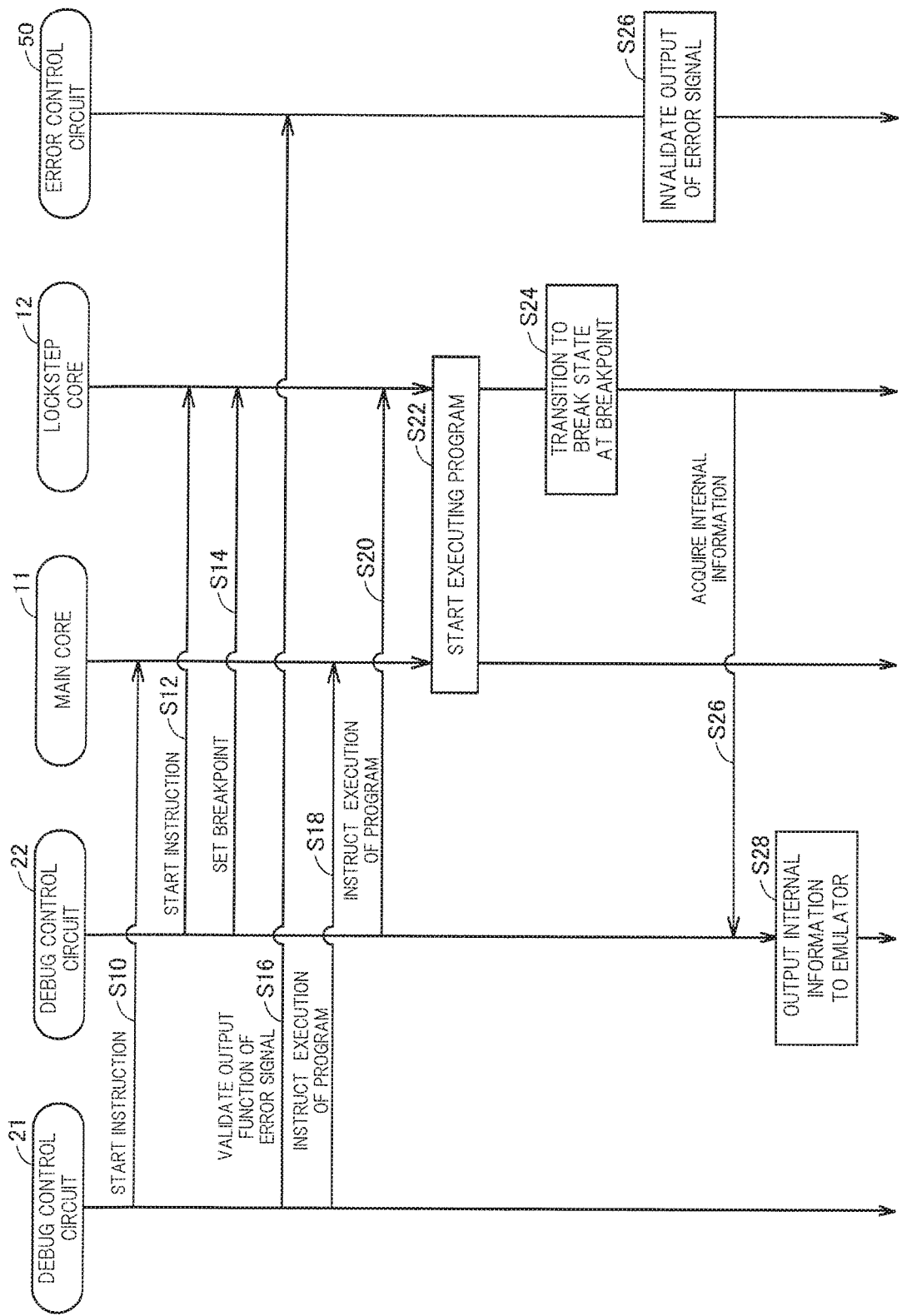
FIG. 6 is a diagram illustrating a processing procedure performed by a debugging system according to the first embodiment.

FIG. 6 is a diagram for explaining a processing procedure executed by the debugging system 1000 according to the first embodiment.

Here, it is assumed that the emulator 200 is connected to the host machine 300 and can instruct the debug control circuits 21 and 22 via the selector 30. Further, the coincidence determination circuit 40 performs coincidence determination between the main processing result and the lockstep processing result in a predetermined cycle, and outputs a coincidence determination signal to the error control circuit 50. Further, it is assumed that the value stored in the mismatch detection setting register 108 of the lockstep core 12 is set to "0", and the output function of the break request signal in the case where the main processing result and the lockstep processing result do not match is invalidated.

Referring to FIG. 6, debug control circuit 21 gives a start instruction to main core 11 in accordance with an instruction from emulator 200 in step S10. In step S12, the debug control circuit 22 gives a start instruction to the lockstep core 12 in accordance with an instruction from the emulator 200. More specifically, the main core 11 and the lock step core 12 are in a break state in which the program is stopped by the reset vector which is the initial address. As a result, the main core 11 and the lockstep core 12 are ready for debugging.

In step S14, the debug control circuit 22 sets a breakpoint in the breakpoint setting register of the lockstep core 12 in accordance with an instruction from the emulator 200.

The debug control circuit 21 sets the error signal output function of the error control circuit 50 to "valid" in accordance with an instruction from the emulator 200 (step S16). Specifically, the debug control circuit 21 sets the value "0" in the error output setting register 51 in order to enable the output function of the error signal. The process of step S16 may be executed by the debug control circuit 22.

In accordance with the instruction from the emulator 200, the debug control circuit 21 instructs the main core 11 to start execution of the program (step S18), and the debug control circuit 22 instructs the lockstep core 12 to start execution of the program (step S20). In step S22, the main core 11 and the lockstep core 12 simultaneously start executing the program in accordance with the instruction. At this time, the main core 11 and the lockstep core 12 transition to the program execution state. For example, when the debug control circuit 21 instructs the main core 11 to start execution of the program, the lockstep core 12 may be configured to start execution of the program at the same time.

Here, when the main core 11 and the lockstep core 12 are in the execution state and the coincidence determination result is inconsistent, an error signal is output from the error control circuit 50, and the main core 11 and the lockstep core 12 are in the break state. Accordingly, it is ensured that both of the main core 11 and the lockstep core 12 are performing the same processing during the duration of the execution state.

Subsequently, when the main processing result and the lockstep processing result coincide when the execution of the program by the lockstep core 12 reaches the breakpoint, the lockstep core 12 transitions to the break state in step S24. More specifically, the request output circuit 110 outputs a break request signal when a breakpoint is detected and the main processing result and the lockstep processing result match, as shown in FIG. 5. Therefore, the lockstep core 12 (instruction executing unit 102) transitions to a break state.

Even if a breakpoint is detected, the break request signal is not output when the main processing result and the lockstep processing result do not match. However, in this case, since the condition that the main core 11 and the lockstep core 12 are in the execution state and the coincidence determination result is inconsistent is satisfied, an error signal is output from the error control circuit 50, and the main core 11 and the lockstep core 12 transition to the break state.

In step S24, when the lockstep core 12 transitions to the break state, the main core 11 is in the execution state, and therefore the coincidence determination result is inconsistent. However, even if the coincidence determination result is inconsistent, if the main core 11 is in the execution state and the lockstep core 12 is in the break state, the error control circuit 50 invalidates the output of the error signal in step S26. That is, the error signal is not output, and the execution state of the main core 11 is continued.

In step S26, the debug control circuit 22 acquires internal information from the lockstep core 12 that has transitioned to the break state in accordance with an instruction from the emulator 200. In step S28, the debug control circuit 22 outputs the read internal information to the emulator 200.

According to the first embodiment, the internal information of the lockstep core can be acquired by keeping the execution state of the main core and breaking the lockstep core. It is also ensured that the internal information of the lockstep core is the same as the internal information of the main core. That is, it is possible to realize non-break debugging in which internal information is acquired while maintaining the execution state of the main core. As a result, it is not necessary to stop the operation of the main core, so that the debugging operation can be efficiently performed, and breakage or the like of an electronic component, for example, a motor, caused by the operation stop can be prevented.

Second Embodiment

In the second embodiment, another example of the debugging function using the lockstep core 12 will be described.

Programming mistakes often result in access violations to uninitialized registers. The uninitialized register is a register to be initialized (hereinafter, also referred to as an "initialization target register") and is not yet initialized due to an initialization omission. The detection of an uninitialized register is possible by performing static analysis by a compiler or the like, but is limited to confirmation by absolute address access.

For example, when reading the value stored at the address of r10 to the address of r11, such as the program code "ld.w 0x0 [r10], r11", the value of r10 may vary depending on the flow of the program before access. Therefore, whether the access destination is uninitialized or not cannot be detected by static analysis.

Therefore, in the second embodiment, a method of appropriately detecting an initialization leak of initialization target registers by using the lockstep core 12 and making debugging work efficient will be described. Note that the overall configuration of the second embodiment is the same as that of the first embodiment.

<Configuration of Processor Core>

In the second embodiment, a debug setting different from that of the main core 11A is performed in the lockstep core 12A. More specifically, the program to be debugged is executed in a state in which different values are set in the initialization target registers of the main core 11 and the initialization target registers of the lockstep core 12. Here, it is assumed that an initialization error has occurred in the initialization target registers, that is, an uninitialized register exists.

In this case, when the main core 11 and the lockstep core 12 access the uninitialized register, different values are read. Therefore, the main processing result and the lockstep processing result do not coincide with each other, and the main core 11 and the lockstep core 12 transition to a break state by the error signal. In this manner, by breaking the main core 11 and the lockstep core 12, it is possible to detect an access violation to an uninitialized register. Hereinafter, the configuration and the like of the processor core 10 according to the second embodiment will be described in detail.

Figure 7:
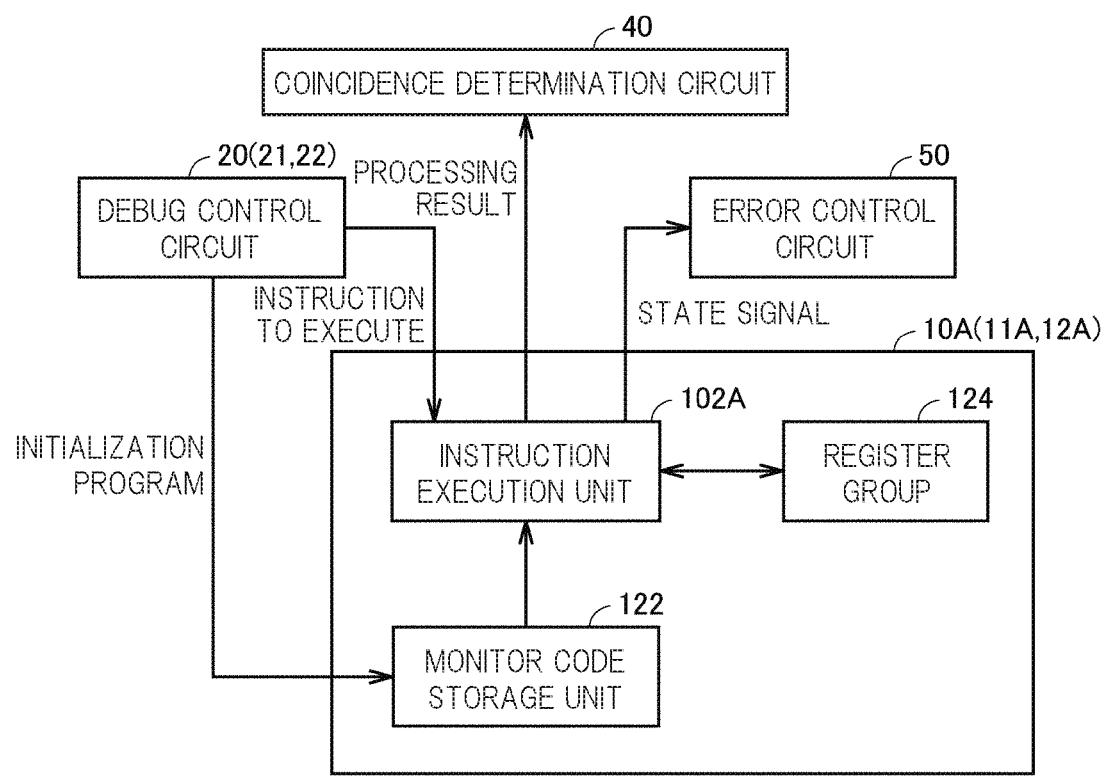
FIG. 7 shows a configuration example of a processor core according to a second embodiment.

FIG. 7 is a diagram showing a configuration example of the processor core 10A according to the second embodiment. The processor core 10A (main core 11A, lockstep core 12A) corresponds to the processor core 10 (main core 11, lockstep core 12) shown in FIG. 1, but for the sake of distinction from the first embodiment, an additional symbol "A" is attached thereto for convenience.

Referring to FIG. 7, processor core 10A includes an instruction execution unit 102A, a monitor code storage unit 122, and a register group 124. The register group 124 includes various registers such as general-purpose registers and special-purpose registers.

The debug control circuit 20 transfers the initialization program to the monitor code storage unit 122 in accordance with an instruction from the emulator 200. The monitor code storage unit 122 stores the transferred initialization program.

The instruction execution unit 102A executes processing in accordance with a control instruction from the debug control circuit 20. The instruction execution unit 102A executes the initialization program stored in the monitor code storage unit 122, and stores a value according to the initialization program in each of the initialization target registers included in the register group 124.

The value according to the initialization program transferred from the debug control circuit 21 to the main core 11A is different from the value according to the initialization program transferred from the debug control circuit 22 to the lockstep core 12A. Therefore, the value set in the initialization target registers in the main core 11A is different from the value set in the initialization target registers in the lockstep core 12A.

The instruction execution unit 102A of each of the main core 11A and the lockstep core 12A starts execution of the program to be debugged after the value according to the initialization program is set in the initialization target registers. At the start of execution of a program to be debugged, each instruction execution unit 102A writes initial values according to the program in initialization target registers specified by the program. Each instruction execution unit 102A accesses the register group 124 and outputs the processing result to the coincidence determination circuit 40.

Here, when an appropriate initial value is written to all the initial target registers by execution of the program to be debugged, that is, there is no initialization error, there is no uninitialized register. Therefore, the same value is set in the initialization target registers of the main core 11A and the initialization target registers of the lockstep core 12A.

On the other hand, when the initial value is not written to the initialization target registers (i.e., the initialization is omitted), an uninitialized register exists. Therefore, different values are set in the uninitialized register of the main core 11A and the uninitialized register of the lockstep core 12A. In this case, the processing result executed by the instruction execution unit 102A of the main core 11A by accessing the uninitialized register is different from the processing result executed by the instruction execution unit 102A of the lockstep core 12A by accessing the uninitialized register.

Therefore, the coincidence determination circuit 40 outputs a coincidence determination signal indicating that the main processing result and the lockstep processing result do not coincide with each other to the error control circuit 50. Since the main core 11A and the lockstep core 12A are in the program execution state, they output a state signal indicating that they are in the execution state to the error control circuit 50.

Since the main core 11A and the lockstep core 12A are in the execution state and the main processing result and the lockstep processing result do not coincide with each other, the error control circuit 50 outputs an error signal, as shown in FIG. 3. Therefore, the main core 11A and the lockstep core 12A transition to a break state by an error signal. As described above, when the main core 11A and the lockstep core 12A access the uninitialized register, the main core 11A and the lockstep core 12A transition to the break state.

The debug control circuit 21 acquires the internal information of the main core 11A that has transitioned to the break state, and outputs the internal information to the emulator 200. The debug control circuit 22 acquires the internal information of the lockstep core 12A that has transitioned to the break state, and outputs the internal information to the emulator 200. The host machine 300 displays the internal information on a display or the like.

<Processing Procedure>

Figure 8:
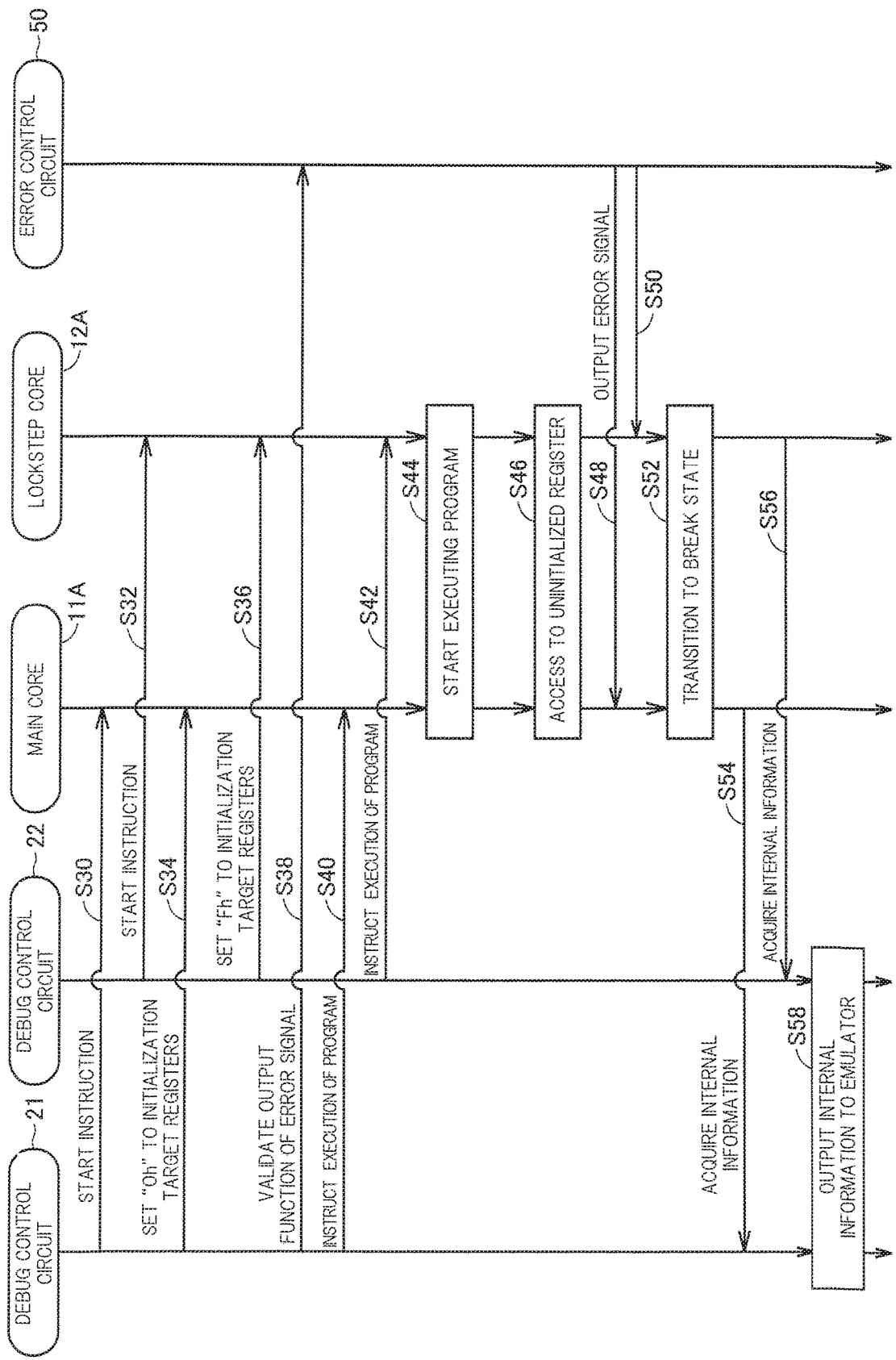
FIG. 8 is a diagram illustrating a processing procedure performed by a debugging system according to the second embodiment.

FIG. 8 is a diagram for explaining a processing procedure executed by the debugging system 1000 according to the second embodiment.

Here, it is assumed that the emulator 200 is connected to the host machine 300 and can instruct the debug control circuits 21 and 22 via the selector 30. Further, the coincidence determination circuit 40 performs coincidence determination between the main processing result and the lockstep processing result in a predetermined cycle, and outputs a coincidence determination signal to the error control circuit 50.

Referring to FIG. 8, debug control circuit 21 gives a start instruction to main core 11A in accordance with an instruction from emulator 200 in step S30. In step S32, the debug control circuit 22 gives a start instruction to the lockstep core 12A in accordance with the instruction from the emulator 200.

In accordance with an instruction from the emulator 200, the debug control circuit 21 initializes all of the initialization target registers of the main core 11A to, for example, a value "0h" (step S34). More specifically, the debug control circuit 21 transfers an initialization program for initializing with the value "0h" to the main core 11A. The value "0h" is set in the initialization target registers by executing the initialization program by the main core 11A.

In accordance with an instruction from the emulator 200, the debug control circuit 22 initializes all of the initialization target registers of the lockstep core 12A with, for example, the value "Fh" (step S36). Specifically, the debug control circuit 22 transfers an initialization program for initializing with the value "Fh". The lockstep core 12A executes the initialization program to set the value "Fh" in the initialization target registers. The value set in the initialization target registers of the lockstep core 12A must be different from the value set in the initialization target registers of the main core 11A.

The debug control circuit 21 sets the error signal output function of the error control circuit 50 to "valid" in accordance with an instruction from the emulator 200 (step S38). In accordance with the instruction from the emulator 200, the debug control circuit 21 instructs the main core 11A to start execution of the program (step S40), and the debug control circuit 22 instructs the lockstep core 12A to start execution of the program (step S42).

In step S44, the main core 11A and the lockstep core 12A simultaneously start execution of the program to be debugged in accordance with the instruction. At this time, the main core 11A and the lockstep core 12A transition to the program execution state. Each of the main core 11A and the lockstep core 12A writes initial values according to a program to be debugged in initialization target registers specified by the program.

Originally, the corresponding initial value should be written in each initialization target register. However, when there is an initialization failure with respect to a specific initialization target register (that is, the specific initialization target register is an uninitialized register), access to the uninitialized register by the main core 11A and the lockstep core 12A occurs (step S46). At this time, since the value read when the main core 11A accesses the uninitialized register is "0h" and the value read when the lockstep core 12A accesses the uninitialized register is "Fh", the main processing result and the lockstep processing result do not match.

In step S44, the main core 11A and the lockstep core 12A have transitioned to the execution state, and the main processing result and the lockstep processing result do not match due to the access violation in step S46. Therefore, the error control circuit 50 outputs an error signal to the main core 11A and the lockstep core 12A in steps S48 and S50. In step S52, the main core 11A and the lockstep core 12A transition to the break state by an error signal.

In step S54, the debug control circuit 21 acquires internal information from the main core 11A that has transitioned to the break state in accordance with an instruction from the emulator 200. In step S56, the debug control circuit 22 acquires internal information from the lockstep core 12A that has transitioned to the break state in accordance with an instruction from the emulator 200. In step S58, the debug control circuits 21 and 22 output the read internal information to the emulator 200.

According to the second embodiment, it is possible to dynamically detect an access violation to an uninitialized register which frequently occurs as a programming miss. This eliminates the need for static detection by compiler and code analysis or large-scale detection circuit, thereby enabling debugging work to be performed more efficiently.

Third Embodiment

In the third embodiment, still another example of the debugging function using the lockstep core 12 will be described.

In order to acquire the internal information of the state past the breakpoint in debugging, it is necessary to re-execute the program after re-setting the breakpoint. However, in many cases, it takes a long time for the program to reach the breakpoint, and in the case where the program reaches the breakpoint only under a specific condition, it is necessary to perform the program again to reproduce the specific condition.

Therefore, in the third embodiment, a method will be described in which, when the main core 11 breaks, the internal information at the break point and the internal information at a certain point in time past the break point are simultaneously acquired to thereby improve the efficiency of the debugging operation. Note that the overall configuration of the third embodiment is the same as that of the first embodiment.

<Configuration of Processor Core>

In the third embodiment, a debug setting different from that of the main core 11B is performed in the lockstep core 12B. Specifically, instructions corresponding to arbitrary cycles are injected (added) into only the instruction buffer of the lockstep core 12, and the execution of the program of the lockstep core 12 is delayed by arbitrary cycles from the execution of the program of the main core 11.

When the main core 11 transitions to the break state, the lockstep core 12 is simultaneously transitioned to the break state. By acquiring the internal information of each of the main core 11 and the lockstep core 12 that has transitioned to the break state, the internal information at the time of the break and the internal information at the time of arbitrary cycles before the time of the break are acquired. Hereinafter, the configuration and the like of the processor core 10 according to the third embodiment will be described in detail.

Figure 9:
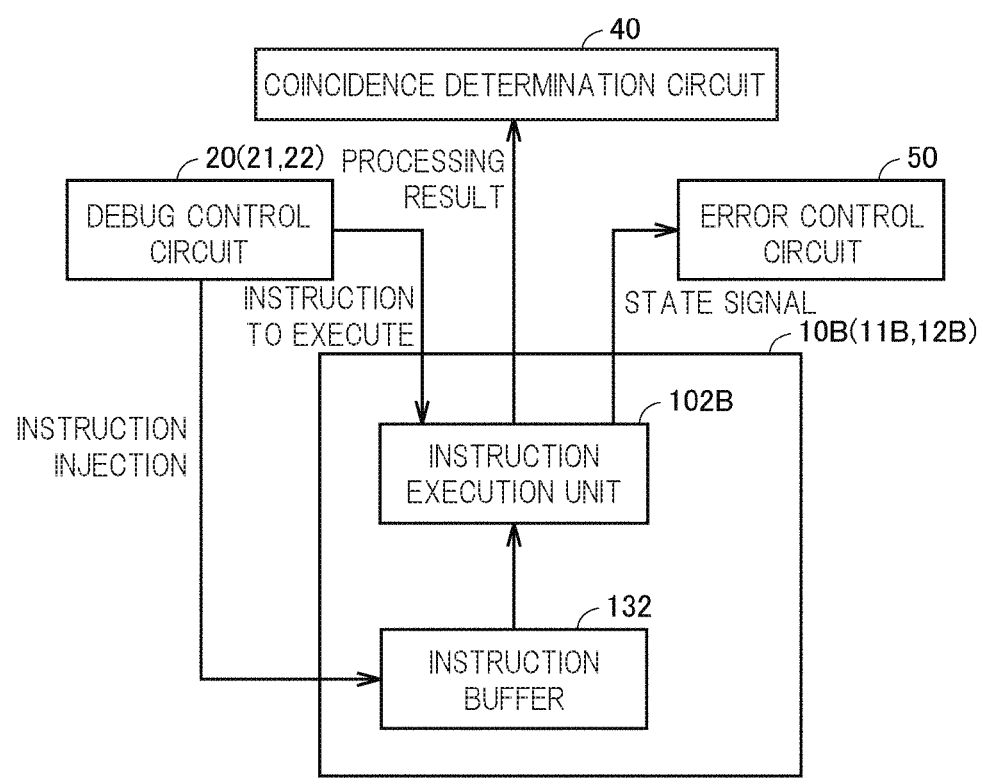
FIG. 9 is an example of a configuration of a processor core according to a third embodiment.

FIG. 9 is a diagram showing a configuration example of the processor core 10B according to the third embodiment. The processor core 10B (main core 11B, lockstep core 12B) corresponds to the processor core 10 (main core 11, lockstep core 12) shown in FIG. 1, but is denoted by an additional symbol "B" for the sake of convenience, in order to distinguish between the first and third embodiments.

Referring to FIG. 9, processor core 10B includes an instruction execution unit 102B and an instruction buffer 132. In FIG. 9, only the configuration of the processor core 10B related to the third embodiment is shown, but the configuration of the processor core according to the first embodiment and the second embodiment may be included.

The instruction buffer 132 stores instructions read from the internal memory. The debug control circuit 22 injects instructions for a predetermined cycle specified by the user into the instruction buffer 132 of the lockstep core 12B in accordance with an instruction from the emulator 200. The instruction execution unit 102B of the lockstep core 12B executes each instruction in the program to be debugged after executing instructions for a predetermined cycle injected into the instruction buffer 132.

On the other hand, the instructions for a predetermined cycle are not injected into the instruction buffer 132 of the main core 11B. Therefore, the instruction execution unit 102B of the lockstep core 12B executes the program to be debugged later than the instruction execution unit 102B of the main core 11B by the predetermined cycle.

Here, during the execution of the program, the main processing result and the lockstep processing result do not match, and therefore, when the error output function is enabled, an error signal is output, and the main core 11B and the lockstep core 12B transition to the break state. Therefore, the debug control circuit 21 or the debug control circuit 22 invalidates the error output function of the error control circuit 50 in accordance with the instruction of the emulator 200. Specifically, the value "1" is set in the error output setting register 51 (see FIG. 3).

When the main core 11B transitions to the break state for some reason, the lockstep core 12B also transitions to the break state at the same time. For example, when the main core 11B transitions to the break state, the main core 11B outputs a state signal indicating that the main core 11B transitions to the break state to the lockstep core 12B. The lock step core 12B transitions to a break state upon receipt of the state signal. It should be noted that the present invention is not limited to the above-described configuration, and the configuration may be such that when one of the two processor cores 10 transitions to the break state, the other may also transition to the break state.

The debug control circuit 21 acquires the internal information of the main core 11B that has transitioned to the break state, that is, the internal information at the time of the break, and outputs the acquired information to the emulator 200. The debug control circuit 22 acquires the internal information (i.e., internal information before the predetermined cycle from the break point) of the lockstep core 12B that has gone into a break state and outputs it to the emulator 200. The host machine 300 displays the internal information on a display or the like.

<Processing Procedure>

FIG. 10 is a diagram for explaining a processing procedure executed by the debugging system 1000 according to the third embodiment. Here, it is assumed that the emulator 200 is connected to the host machine 300 and can instruct the debug control circuits 21 and 22 via the selector 30.

Referring to FIG. 10, debug control circuit 21 gives a start instruction to main core 11B in accordance with an instruction from emulator 200 in step S70. In step S72, the debug control circuit 22 gives a start instruction to the lockstep core 12B in accordance with the instruction from the emulator 200.

In step S74, the debug control circuit 22 injects instructions for predetermined cycles into the instruction buffer 132 of the lockstep core 12B in accordance with an instruction from the emulator 200. The debug control circuit 21 sets the error signal output function of the error control circuit 50 to "invalid" in accordance with an instruction from the emulator 200 (step S76).

In accordance with the instruction from the emulator 200, the debug control circuit 21 instructs the main core 11B to start execution of the program (step S78), and the debug control circuit 22 instructs the lockstep core 12B to start execution of the program (step S80).

The main core 11B starts execution of the program to be debugged, and the lockstep core 12B starts execution of the program to be debugged after executing the injected instructions for a predetermined cycle. That is, the lockstep core 12B executes the program to be debugged after a predetermined cycle has elapsed from the main core 11B. Although the main processing result and the lockstep processing result do not coincide with each other, the output function of the error control circuit 50 is invalidated, so that the execution states of the main core 11B and the lockstep core 12B are continued.

Subsequently, when the main core 11B transitions to the break state (step S84), the lockstep core 12B also transitions to the break state (step S86). For example, the user uses the host machine 300 to forcibly shift the main core 11B to the break state.

In step S88, the debug control circuit 21 acquires internal information from the main core 11B that has transitioned to the break state in accordance with an instruction from the emulator 200. In step S90, the debug control circuit 22 acquires internal information from the lockstep core 12B that has transitioned to the break state in accordance with an instruction from the emulator 200.

In step S92, the debug control circuits 21 and 22 output the acquired internal information to the emulator 200. The internal information acquired by the debug control circuit 21 is used as internal information at the time of break, and the internal information acquired by the debug control circuit 22 is used as internal information at a predetermined cycle before the time of break.

According to the third embodiment, the internal information at the time of break and the internal information at the time before the time of break by a predetermined cycle can be simultaneously acquired. In addition, debugging using step execution or the like is performed from a time which is a predetermined cycle before the break point, and the operation up to the break point can be confirmed. This facilitates the investigation of the cause of the break, thereby making the debugging work more efficient.

In the above-described embodiments, the processes and configurations described in other embodiments may be appropriately employed and performed.

Although the invention made by the present inventor has been specifically described based on the embodiment, the present invention is not limited to the above embodiment, and it is needless to say that various modifications can be made without departing from the gist thereof.

What is claimed is:

1. A semiconductor apparatus comprising:
   a first processor core that executes a program;
   a second processor core that executes the program, the second processor core having a redundant configuration with respect to the first processor core;
   a first debug circuit that performs a first debug setting for the first processor core;
   a second debug circuit that 1) performs a second debug setting for the second processor core and 2) sets a breakpoint for stopping the execution of the program by the second processor core, the second debug setting being different from the first debug setting;
   a determination circuit that determines whether a first processing result of the program by the first processor core matches a second processing result of the program by the second processor core; and
   an error control circuit that outputs an error signal for stopping the execution of the program by both the first processor core and the second processor core based on a determination result of the determination circuit that the first processing result does not match the second processing result,
   wherein when the breakpoint is reached, the second processor core stops the execution of the program,
   wherein when the second processor core stops the execution of the program in response to the breakpoint being reached while the first processor core continues to execute the program, the error control circuit prevents the error signal from being output even if the first processing result does not match the second processing result, wherein the error control circuit disables outputting the error signal;

wherein the second debug circuit injects instructions for a predetermined cycle into an instruction buffer of the second processor core in accordance with an instruction from an emulator, wherein the instructions for the predetermined cycles are not injected into the instruction buffer of the first processor core;

wherein the execution of program of the second processor core is delayed by the predetermined cycle from the execution of the program of the first processor core, and wherein the second processor core stops execution of the program when the first processor core stops execution of the program.

2. The semiconductor apparatus according to claim 1 further comprising a selection circuit that selects at least one of the first debug circuit and the second debug circuit to provide the instruction from the emulator, wherein the first debug circuit performs the first setting regarding the debugging in accordance with the instruction from the emulator, wherein the second debug circuit performs the second setting regarding the debugging in accordance with the instruction from the emulator.

3. The semiconductor apparatus according to claim 1, wherein the second debug circuit acquires internal information of the second processor core in which execution of the program is stopped.

4. The semiconductor apparatus according to claim 1, wherein stopping the execution of the program by the second processor core includes:

executes an instruction included in the program;

determines whether the breakpoint is reached based on an execution address of the instruction and the breakpoint set by the second debug circuit; and stops the execution of the program based on 1) determining that the breakpoint is reached and 2) the first processing result not matching the second processing result.

5. The semiconductor apparatus according to claim 1, wherein the first debug circuit acquires internal information of the first processor core after the first processor core is stopped, and wherein the second debug circuit acquires internal information of the stopped second processor core after the second processor core is stopped.

6. A semiconductor apparatus comprising:

a first processor core that 1) executes a program and 2) includes a first initialization target register;

a second processor core that 1) executes the program and 2) includes a second initialization target register, the second initialization target register of the second processor core corresponding to the first initialization target register of the first processor core, the second processor core having a redundant configuration with respect to the first processor core;

a first debug circuit that 1) performs a first debug setting for the first processor core and 2) sets, in the first initialization target register, an initial value specified by the program to be executed by the first processor core;

a second debug circuit that 1) performs a second debug setting for the second processor core, the second debug setting being different from the first debug setting, and 2) sets, in the second initialization target register, the initial value specified by the program to be executed by the second processor core;

a determination circuit that determines whether a first processing result of the program by the first processor core matches a second processing result of the program by the second processor core; and an error control circuit that outputs an error signal for stopping the execution of the program by both the first processor core and the second processor core based on a determination result of the determination circuit that the first processing result does not match the second processing result, wherein the first processor core and the second processor core start execution of the program after both the first processor core and the second processor core complete writing the initial value specified by the program into the first initialization target register and the second initialization target register, respectively, wherein the error control circuit disables outputting the error signal;

wherein the second debug circuit injects instructions for a predetermined cycle into an instruction buffer of the second processor core in accordance with an instruction from an emulator, wherein the instructions for the predetermined cycles are not injected into the instruction buffer of the first processor core;

wherein the execution of program of the second processor core is delayed by the predetermined cycle from the execution of the program of the first processor core, and wherein the second processor core stops execution of the program when the first processor core stops execution of the program.

7. The semiconductor apparatus according to claim 6, wherein the first debug circuit acquires internal information of the first processor core after the first processor core is stopped, and wherein the second debug circuit acquires internal information of the second processor core after the second processor core is stopped.

8. A debugging method executed by a computer including 1) a first processor core that executes a program and 2) a second processor core that i) executes the program and ii) has a redundant configuration with respect to the first processor core, the debugging method comprising:

setting a breakpoint for stopping the execution of the program by the second processor core;

performing 1) a first debug setting for the first processor core and 2) a second debug setting for the second processor core, the second debug setting being different from the first debug setting; and outputting an error signal for stopping the execution of the program by both the first processor core and the second processor core based on determining that a first processing result of the program by the first processor core does not match a second processing result of the program by the second processor core, wherein when the breakpoint is reached, the second processor core stops the execution of the program, wherein when the second processor core stops the execution of the program in response to the breakpoint being reached while the first processor core continues to execute the program, outputting of the error signal is prevented even if the first processing result does not match the second processing result, wherein the error control circuit disables outputting the error signal;

wherein the second debug circuit injects instructions for a predetermined cycle into an instruction buffer of the second processor core in accordance with an instruction from an emulator, wherein the instructions for the predetermined cycles are not injected into the instruction buffer of the first processor core;

wherein the execution of program of the second processor core is delayed by the predetermined cycle from the execution of the program of the first processor core, and wherein the second processor core stops execution of the program when the first processor core stops execution of the program.

* * * * *